United States Patent [19]

Ota

[11] Patent Number: 5,526,209
[45] Date of Patent: Jun. 11, 1996

[54] TAPE CASSETTE WITH REDUCED WEAR OF POSITIONING HOLES

[75] Inventor: Takashi Ota, Miyagi, Japan

[73] Assignee: Sony Corporation, Tokyo, Japan

[21] Appl. No.: 3,653

[22] Filed: Jan. 13, 1993

[30] Foreign Application Priority Data

Jan. 29, 1992 [JP] Japan .................. 4-013519

[51] Int. Cl.⁶ .................................. G11B 23/087
[52] U.S. Cl. ............................................... 360/132
[58] Field of Search ........................... 360/132, 130; 242/199; 384/276, 280, 281; D15/143

[56] References Cited

U.S. PATENT DOCUMENTS

| | | | |
|---|---|---|---|
| 1,297,142 | 3/1919 | Gibbons | 384/276 |
| 2,543,154 | 2/1951 | Cox | 384/276 |
| 3,186,287 | 6/1965 | Wehlau | 384/276 |
| 3,754,696 | 8/1973 | Rietbergen | 226/179 |
| 3,784,264 | 1/1974 | Jackson, Jr. | 384/276 |
| 3,829,184 | 8/1974 | Chevret | 384/280 |
| 4,042,186 | 8/1977 | Moosberg | 242/84.42 |
| 4,097,006 | 6/1978 | Saito | 242/347.2 |
| 4,113,305 | 9/1978 | Hampton | 297/69 |
| 5,025,335 | 6/1991 | Stefansky | 360/137 |
| 5,175,661 | 12/1992 | Mizuno et al. | 360/132 |

FOREIGN PATENT DOCUMENTS 2150532   7/1985   United Kingdom.

OTHER PUBLICATIONS

Patent Abstracts of Japan, vol. 068, No. 010 (P-437) 18 Mar. 1986 JP-A-60 205 884 (Matsushita Denki) 17 Oct. 1985 *abstract*.

Primary Examiner—Stuart S. Levy
Assistant Examiner—David L. Ometz
Attorney, Agent, or Firm—William S. Frommer; Alvin Sinderbrand

[57] ABSTRACT

A tape cassette comprises a cassette proper for containing therein a recording tape. The cassette proper is constructed of a plastic. At least one positioning opening with a collar therearound is provided in the cassette proper. An annular bearing member is fitted in the positioning opening to reinforce the same. The annular bearing member is constructed of a relatively highly wear resistant material which has a relatively low sliding friction.

11 Claims, 1 Drawing Sheet

TAPE CASSETTE WITH REDUCED WEAR OF POSITIONING HOLES

BACKGROUND OF THE INVENTION

1. Field of the Invention

The present invention relates in general to audio and visual equipment, and more particularly to tape cassettes for such equipment, which have recording tapes installed therein.

2. Description of the Prior Art

In current audio and visual equipment, tape cassettes have been widely used for the case with which they can be handled. They are usually constructed of plastics and have a recording tape installed therein.

In order to clarify the purpose of the present invention, a conventional video tape cassette 1 will be described briefly with reference to FIG. 4 of the accompanying drawing.

In the drawing, the numeral 2 denotes a lower shell of the video tape cassette 1. Denoted by numeral 3 is a pivotal front lid of the tape cassette 1. The lower shell 2 is provided at its front side near the front lid 3 with a first pair of positioning openings 1A and 1A and at its rear side with second pair of positioning openings 1B and 1B. When the tape cassette 1 is put into a video tape cassette player, metal positioning pins of the player are inserted into the corresponding positioning openings 1A, 1A, 1B and 1B to achieve positioning of the tape cassette 1 relative to the player.

However, hitherto, the durability of the positioning openings 1A, 1A, 1B and 1B, more specifically, the durability of the lower shell 2 at the portions which define the openings 1A, 1A, 1B and 1B has been given little thought. In fact, after long use of the tape cassette, the opening defining portions of the lower cassette 2 have shown marked wear due to repeated sliding engagement between the positioning openings 1A, 1A, 1B and 1B and the corresponding positioning pins of the player. In such case, accurate positioning of the worn tape cassette 1 relative to the player is almost impossible.

SUMMARY OF THE INVENTION

It is therefore an object of the present invention to provide a tape cassette which is free of the above-mentioned drawback.

According to the present invention, there is provided a tape cassette whose positioning openings are constructed to bear up against the repeated sliding engagement with the positioning metal pins of the player.

According to the present invention, there is provided a tape cassette in which each of the positioning openings of the tape cassette is reinforced by a wear-resistant bearing member inserted therein.

According to a first aspect of the present invention, there is provided a tape cassette which comprises a cassette proper for containing therein a recording tape; means for defining at least one positioning opening in the cassette proper; and a wear-resistant bearing member fitted in the positioning opening to reinforce the same.

According to a second aspect of the present invention, there is provided a tape cassette which comprises a cassette proper for containing therein a recording tape, the cassette proper being constructed of a plastic; means for defining at least one collared positioning opening in the cassette proper; and an annular bearing member fitted in the positioning opening to reinforce the same, the annular bearing member being constructed of a material having higher wear resistance and less sliding friction than the plastic material forming the cassette proper.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
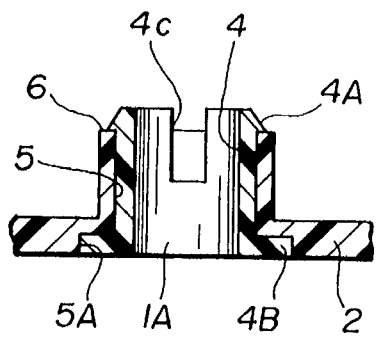
FIG. 1 is an enlarged sectional view of an essential portion of a tape cassette according to an embodiment of the present invention, showing an annular bearing member fitted in an opening of a lower shell.
Figure 2:
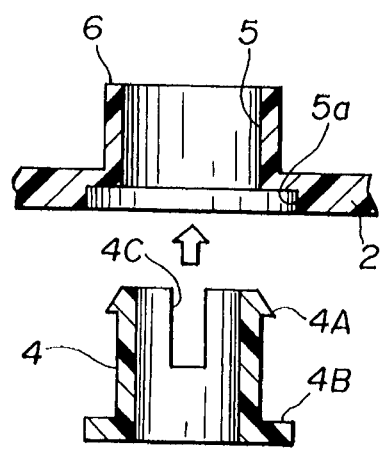
FIG. 2 is a view similar to FIG. 1, but showing a condition wherein the annular bearing member is separated from the lower shell.

Referring particularly to FIGS. 1 and 2, it will be noted that a tape cassette according to an embodiment of the present invention includes a lower shell 2 to which an upper shell (not shown) is fixed to constitute a tape chamber therebetween. The lower and upper shells are constructed of plastic, such as, acrylonitrile-butadiene-styrene, polystyrene or the like. As is understood from FIG. 2, the lower shell 2 is formed with openings 5 each formed with an upstanding collar 6 extending therearound and only one of which is shown. Each opening 5 is formed with an enlarged or counter-bored bottom portion 5a, as shown.

An annular bearing member 4 is fitted in each collared opening 5 to define a reinforced positioning opening 1A. The annular bearing member 4 is constructed of a material, such as polyoxymethylene or the like, having a relatively high wear resistance and a relatively low co-efficient of sliding friction. If desired, a metallic bearing member may be used. More specifically, the annular bearing member 4 is constructed of a material whose wear resistance is higher than that of the material of the lower shell 2, and whose sliding friction relative to the metal positioning pin is less than that of the material of the lower shell 2.

Figure 3:
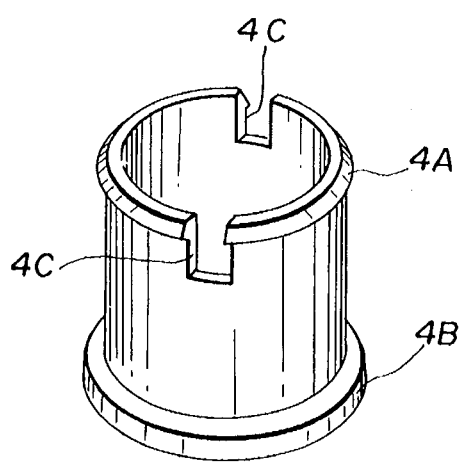
FIG. 3 is a perspective view of the annular bearing member.
Figure 4:
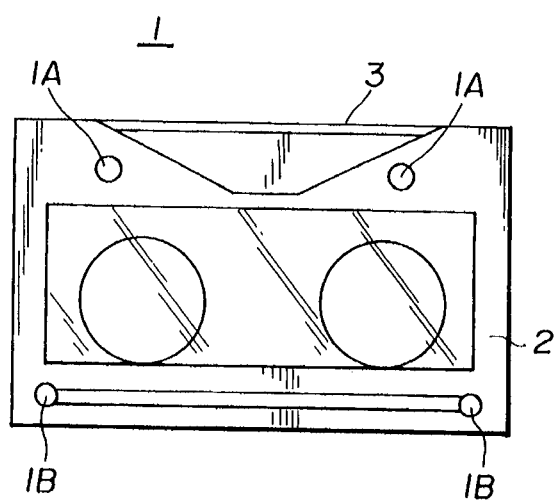
FIG. 4 is a bottom view of a conventional tape cassette.

As is seen from FIGS. 2 and 3, the annular bearing member 4 is formed with a head portion 4A of arrow-shaped cross-section and an annular outwardly directed base flange 4B. The leading or upper end portion of the annular bearing member 4 is formed, at its diametrically opposed portions, with rectangular cuts 4C opening upwardly through the head portion 4A. As is seen from FIG. 1, the base flange 4B is dimensioned so as to match or fit closely within the enlarged bottom portion 5a of the collared opening 5 of the lower shell 2.

In coupling together each bearing 4 with the cassette shell 2, the annular bearing 4 is inserted upwardly into the collared opening 5 from the underside of the lower shell 2. This insertion is made prior to the fixing of the upper shell to the lower shell 2. Due to provision of the diametrically opposed cuts 4C, during the insertion of the bearing 4 into the collared opening 5, the arrow-shaped head portion 4A is resiliently deformed inward. When the annular bearing member 4 is brought to a terminal position in the opening 5, the resiliently deformed arrow-shaped head portion 4A expands radially outward thereby to engage with the upper end edge of the collar 6 extending around. opening 5, and at the same time, the base flange 4B of the annular bearing member 4 is intimately fitted in the enlarged bottom portion 5a of the collared opening 5, as is seen from FIG. 1. Upon the occurrence of the foregoing, the annular bearing member 4 is latched to the collared opening 5.

As is understood from the foregoing description, in accordance with the present invention, the positioning opening of the tape cassette is reinforced by a bearing member 4 which is constructed of material of high wear resistance relatively small and less sliding friction, such as polyoxymethylene, metal or the like. Accordingly, undesired marked wear of the positioning opening of the tape cassette does not occur, and thus, accurate positioning of the tape cassette relative to the player is assured for a long time.

Possible modifications of the above will now be described.

If desired, the annular bearing member 4 may be installed in the lower shell 2 by means of the integral molding technique. In that case, the annular bearing member 4 is handled as an insert.

If desired, the annular bearing members 4 may be applied to only selected ones of the openings 5 of the lower shell 2.

What is claimed is:

1. A tape cassette comprising:

a cassette shell molded of a plastic material for containing a recording tape and having a lower portion; means for defining at least one positioning opening in said lower portion of the cassette shell and which has a generally cylindrical upstanding collar of said plastic material extending around said positioning opening into the interior of said cassette shell; and an annular cylindrical bearing member formed independently of said shell and being fitted in said positioning opening for reinforcing the latter, said bearing member having a base flange at one end to bear against said lower portion of the shell and an outwardly directed head portion at the opposite end of the bearing member defining an annular seat facing axially toward said base flange to engage over an upper edge of said upstanding collar for securing said bearing member in respect to said shell, said bearing member being formed of a material having a higher wear resistance and a lower sliding friction than said plastic material of said shell.

2. A tape cassette as claimed in claim 1, in which said bearing member is formed of polyoxymethylene.

3. A tape cassette as claimed in claim 1, in which said bearing member is formed of a metal.

4. A tape cassette as claimed in claim 1, in which said cassette shell is constructed of acrylonitrile-butadiene-styrene.

5. A tape cassette as claimed in claim 1, in which said cassette shell is constructed of polystyrene.

6. A tape cassette as claimed in claim 1; in which said head portion of the bearing member is arrow-shaped in cross-section to provide a tapered outer surface extending from the outer periphery of said annular seat and which permits said bearing member to be fitted in said positioning opening in a snap action manner.

7. A tape cassette as claimed in claim 6; in which said bearing member has opposed slots opening at said end of the bearing member provided with said head portion to permit resilient contraction of the bearing member at said head portion when the latter passes through said positioning opening and said collar therearound.

8. A tape cassette as claimed in claim 1, in which said positioning opening is formed near a front lid pivotally connected to a front end of said cassette shell.

9. A tape cassette as claimed in claim 1; in which said positioning opening is counter-bored to provide an annular recess in an underside of said cassette shell in which said base flange of the bearing member is closely received.

10. A tape cassette as claimed in claim 1; in which said cassette shell is integrally molded about said bearing member.

11. A tape cassette comprising:

a cassette shell molded of a plastic material for containing a recording tape and having a lower portion; means for defining at least one positioning opening in said lower portion of the cassette shell and a generally cylindrical upstanding collar of said plastic material extending around said positioning opening into the interior of said cassette shell, said positioning opening having a counter-bore at its lower end defining a circular recess in an underside of said lower portion of the cassette shell; and an annular bearing member formed independently of said shell of a material having a higher wear resistance and a lower sliding friction than said plastic material of which the cassette shell is molded, said bearing member including a cylindrical, open-ended body, a base flange extending outwardly from one end of said body and being dimensioned to be received closely in said circular recess, and an outwardly directed head portion at the opposite end of said body spaced from said base flange and defining an annular seat facing axially toward said base flange so as to engage closely over an upper edge of said collar for securing said bearing member to said shell when said base flange is in said recess, said head portion having a tapering outer surface extending from the outer periphery of said annular seat and said body having opposed slots opening axially through said head portion to permit resilient contraction of the bearing member at said head portion when the latter passes through said positioning opening and said collar therearound.

\* \* \* \* \*